United States Patent
Nishio et al.

(10) Patent No.: US 6,728,717 B2
(45) Date of Patent: Apr. 27, 2004

(54) STORAGE SYSTEM WITH ONLINE MANUAL

(75) Inventors: Takanori Nishio, Tokyo (JP);
Masanari Minefuji, Tokyo (JP);
Junichi Hiwatashi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 258 days.

(21) Appl. No.: 09/825,669

(22) Filed: Apr. 3, 2001

(65) Prior Publication Data

US 2002/0056058 A1 May 9, 2002

(30) Foreign Application Priority Data

May 25, 2000 (JP) ........................... P2000-159548

(51) Int. Cl.[7] .............................................. G06F 17/30
(52) U.S. Cl. ..................... 707/10; 707/200; 707/100; 709/227; 709/228
(58) Field of Search .................... 715/511; 709/223, 709/228, 227, 225, 224; 717/173, 174; 707/100, 200, 1, 3, 10; 705/23; 345/762

(56) References Cited

U.S. PATENT DOCUMENTS

| | | | |
|---|---|---|---|
| 5,859,977 A | * 1/1999 | Nishiyama et al. | 709/223 |
| 5,893,128 A | * 4/1999 | Nauckhoff | 715/511 |
| 6,427,132 B1 | * 7/2002 | Bowman-Amuah | 703/22 |
| 6,449,588 B1 | * 9/2002 | Bowman-Amuah | 703/21 |
| 6,564,209 B1 | * 5/2003 | Dempski et al. | 707/3 |
| 6,606,744 B1 | * 8/2003 | Mikurak | 717/174 |
| 6,611,867 B1 | * 8/2003 | Bowman-Amuah | 709/224 |
| 2002/0016841 A1 | * 2/2002 | Hirashima et al. | 709/225 |
| 2002/0120596 A1 | * 8/2002 | Gershoff et al. | 707/1 |
| 2002/0198609 A1 | * 12/2002 | Baron | 700/48 |
| 2003/0055753 A1 | * 3/2003 | Dellar et al. | 705/29 |

FOREIGN PATENT DOCUMENTS

| | | |
|---|---|---|
| JP | 05-298045 | 11/1993 |
| JP | 05-313774 | 11/1993 |
| JP | 07-249033 | 9/1995 |
| JP | 08-123711 | 5/1996 |
| JP | 08-212161 | 8/1996 |
| JP | 10-021037 | 1/1998 |
| JP | 10-154086 | 6/1998 |

OTHER PUBLICATIONS

Vicki Coleman, "Hardcopy to Hypertext: Putting a technical manual online", ACM, p. 67–72, 1991.*

* cited by examiner

*Primary Examiner*—Jean M. Corrielus
(74) *Attorney, Agent, or Firm*—Townsend and Townsend and Crew LLP

(57) ABSTRACT

Online manual display mechanisms that display a portion of a manual during execution of an application program are available conventionally. However, those manuals are not easy to use because manual display cannot be performed so as to follow execution of an application program or a proper portion cannot be opened. The invention provides a unified means for realizing a function displaying a manual portion corresponding to a manipulation for each program by providing, as a manual management mechanism, a graphical user interface to be used for registering manipulation units and a manual as well as APIs that can be referred to by an application program during its execution. The invention also provides a means for downloading a manual from its storage site over the Internet.

22 Claims, 3 Drawing Sheets

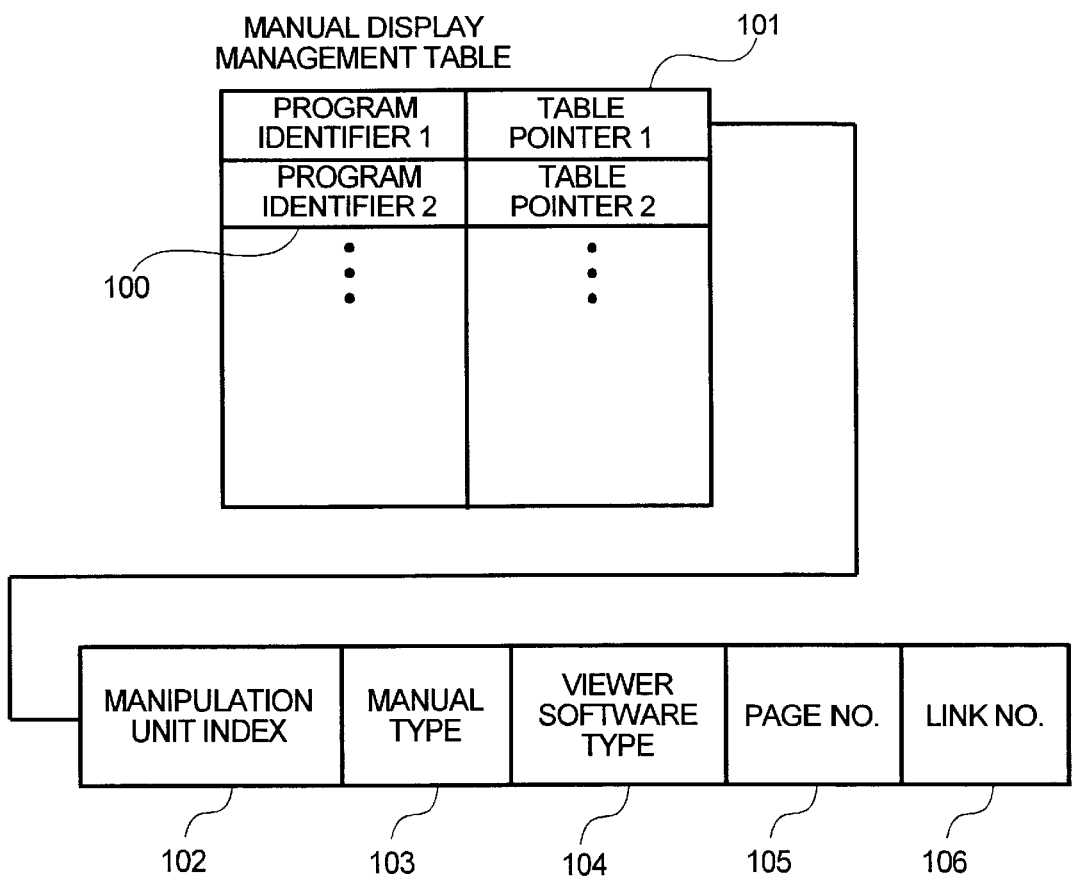

STORAGE SYSTEM WITH ONLINE MANUAL

BACKGROUND OF THE INVENTION

1. Field of the Invention

The present invention relates to a method for displaying an online manual of a program for supporting routinized maintenance manipulations and control manipulations in a storage system.

2. Description of the Prior Art

With conventional online manuals, a portion of the manual is displayed when the corresponding application program is executed, and such functions as indices, movement to the next page, and page return are provided. Those manuals do not relate to the execution itself of the application program. Even when an on-line manual is referred to at any procedure, the initial menu picture of the manual is always displayed first. The manual is manipulated in such a manner that a jump is made from the initial menu picture to a portion to be referred to.

In Japanese Unexamined Patent Publication No. Hei. 8-212161 entitled "Business Manual Making Support System" as an example of such manuals, a means for storing explanatory sentences of business specification information and a business manual in a system. A means is proposed that displays particular manual information from a particular picture by adding, to each of the explanatory sentences of the business specification information, information indicating a menu item on the screen in response to selection of which each of the explanatory sentences should be displayed.

Japanese Unexamined Patent Publication No. Hei. 5-298045 entitled "Hyper Media Help System" proposes, for hyper media that are linked to each other via hyper links, a system in which an inference means outputs a help message suitable for a manipulation state using a knowledge base when an instruction to display a help message is made.

Japanese Unexamined Patent Publication No. Hei. 10-21037 entitled "Auto-help System" proposes a system that determines a proper help item based on an input command and history information and extracts and displays help information by searching an online manual.

Japanese Unexamined Patent Publication No. Hei. 7-249033 entitled "Manipulation Help Execution Apparatus" proposes a method that judges a manipulation state in response to an input manipulation, issues a command based on the manipulation state, and performs an adaptive help function.

In the above conventional online manuals, when an operator who is not familiar with manipulations or when an operator uses a function first, it is difficult to find a proper statement in referring to a manual description relating to a manipulation unless he knows the configuration and the contents of the manual.

Specifically, in the method of the publication No. Hei. 8-212161, it is necessary to a dictionary that is dedicated to the system based on an existing manual for each application system and store the generated dictionary.

In the method of the publication No. Hei. 5-298045, since a state is judged by the inference means and then a message is selected, the operation is indecisive. Therefore, this method is not suitable for a program for maintaining and controlling a storage system that supports routine work that is performed based on a manual or a manipulation procedure document that has been read many times.

In the method of the publication No. Hei. 10-21037, a displayed content of an online manual for the same manipulation may vary depending on the manner of selection from extracted help items. Therefore, this method is not suitable for a program for maintaining and controlling a storage system that supports routine work that is performed based on a manual or a manipulation procedure document that has been read many times.

In the method of the publication No. Hei. 7-249033, the apparatus operates in response to a manual input of an operator. Therefore, when a manipulation unit transition occurs with no input manipulation, that is, when a computer receives a state notice (e.g., occurrence of an abnormality in a storage system) from a storage system, this method cannot cope with, for example, a case of displaying a description relating to the abnormality in a manual or a manipulation procedure document. Further, being of such a type that a manipulation help execution apparatus is incorporated in a system, this method is not suitable for a case where a common method deals with a plurality of applications.

SUMMARY OF THE INVENTION

To solve the above problems, according to the present invention, a process of issuing a state transition message in response to a transfer from one procedure to another to monitor a state transition between manipulation procedures and device state notices is buried in a program that defines a process of an application, whereby a transition state between manipulation procedures is managed at each time point as the application is executed. A mechanism of determining a related page of a manipulation procedure document based on a transition state between manipulation procedures at a time point of online manual display and instructing a viewer tool (for displaying a manipulation procedure document) to display the determined page is also incorporated in the program. Further, at a time point of online manual display, information indicating a corresponding relationship between the version of the manual to be displayed and the version of the program is referred to. If they do not conform to each other, a proper version of the manual concerned is downloaded from a storage site of the manual over the Internet. This enables display of a manual that is not installed in the computer originally.

BRIEF DESCRIPTION OF THE DRAWINGS

FIG. 2 shows the structure of a manual display management table;

FIG. 3 shows the structure of a manual version management table; and

DESCRIPTION OF THE PREFERRED EMBODIMENTS

Figure 1:
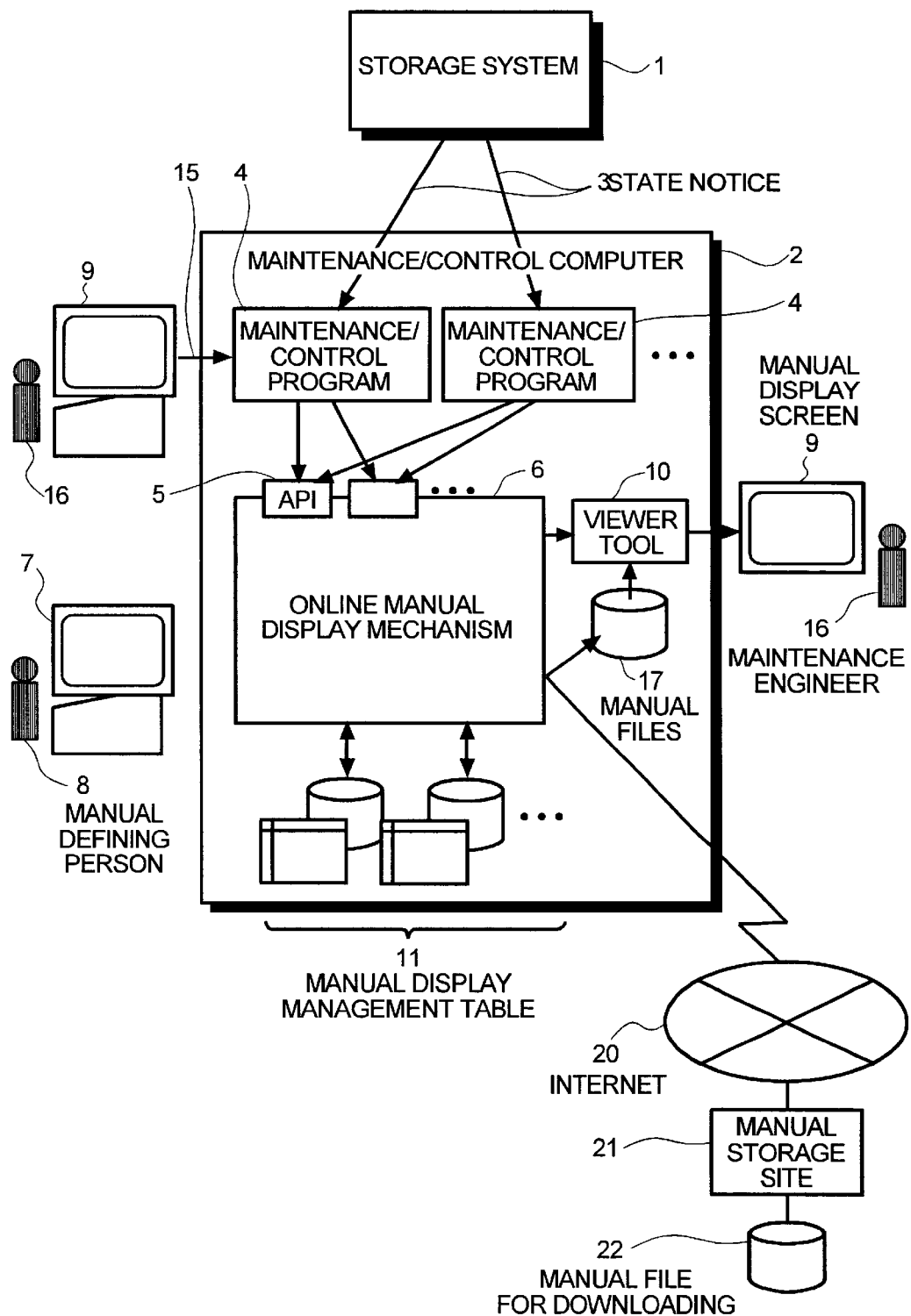
FIG. 1 is a conceptual diagram showing a manual display mechanism according to an embodiment of the present invention.

FIG. 1 outlines an exemplary system according to an embodiment of the present invention. An online manual display mechanism 6 according to the embodiment of the invention is software on a computer 2 that is part of a maintenance or control environment of a storage system 1. The online manual display mechanism 6 has an online manual defining interface 7 that is used by an online manual defining person 8 registers each manipulation unit that is a unit of a manipulation procedure and an online manual page corresponding to the manipulation unit. For example, where a subject program 4 is to display a plurality of pictures, each picture can be defined as a manipulation unit of the program 4. An index number is defined for each manipulation unit and buried in the program 4 in advance. The index numbers are used as identifiers for uniquely identifying manipulation procedures in the subject program 4. At the time of registration, index numbers and online manual pages are correlated with each other. At this time, to facilitate registration manipulations of the online manual defining person 8, each manipulation may be given a name.

To manage the manipulation units of each subject program 4 and the display positions of an online manual in a correlated manner, the online manual display mechanism 6 has, as an external file, a manual display management table 11 that contains data of the respective subject programs 4. The online manual display mechanism 6 has a function of storing and referring to the manual display management table 11.

FIG. 2 shows the internal structure of the manual display management table 11. containing the data of the respective subject programs 4, the manual display management table 11 has such a structure that a table pointer 101 indicating a table that contains data of each program 4 is determined based on a program identifier 100.

The data of each program 4 are registered in such a manner as to be correlated with respective manipulation unit indices 102. The contents of each data are a type 103 of an on-line manual corresponding to a manipulation, a type 104 of dedicated viewer software 10 for displaying the online manual, a related page number 105 of the online manual, and a related line number 106 on the page. The online manual type 103 prescribes the dedicated viewer software 10 for displaying the manual. Therefore, the online manual type 103 is designated by the name of a file having such a data format as to be able to be read by the dedicated viewer software 10. The page number 105 and the line number 106 are integers and can be omitted. When omitted, they are interpreted as the first page and its first line of the manual.

FIG. 3 shows the internal structure of an online-manual version management table 18. The table 18 has records for respective document types. Each record correlates each version of a document of the document type with a program version. Each record also has a charged/free flag indicating whether the document should be paid for or free and credit data that a customer has acquired from a program provider (in a case where the document should be paid for). The credit data is data that a program provider issues to each customer and is a coded customer name. When receiving a manual downloading request, a program storage site collates the customer name with the credit data and checks whether the request is legitimate. If the request is legitimate, the program storage site permits downloading of the manual.

Index numbers corresponding to respective manipulation units of each subject program 4 are input through the online manual defining interface 7 so as to be correlated with related manual types and display positions (pages and lines). The related information is registered, updated, and managed by means of the manual display management table 11. When each subject program 4 is installed in the computer 2, the manual display management table 11 that is defined as corresponding to the subject program 4 is registered in the manual display mechanism 6.

The online manual display mechanism 6 according to the embodiment of the invention has, in addition to the online manual defining interface 7, APIs (application program interfaces) 5 that each subject program 4 can call while being executed. At least the following APIs 5 are prepared.

API-1 is an API for manipulation state referencing. API-1 has a program identifier as a parameter. API-1 acquires, as a return value, a manipulation index value that indicates a current execution manipulation unit in a subject program 4 recognized by the program identifier at a time point when API-1 is called by the subject program 4.

API-2 is an API for manipulation state transition notification. API-2 has, as parameters, a program identifier and an identifier (index value) of a new manipulation unit for updating. API-2 updates a current manipulation unit that is managed by the mechanism 6 at a time point when the API-2 is called by a subject program 4 indicated by the program identifier to an execution manipulation unit indicated by a manipulation unit identifier that has newly been received as a parameter.

In a trace mode, API-2 determines a display position of the online manual corresponding to the current manipulation unit by using the manual display management table 11 and instructs the dedicated viewer software 10 to make a display at the determined display position.

API-3 is an API for online manual display. API-3 has a program identifier as an input parameter. API-3 instructs the online manual display mechanism 6 to display a page/line of an online manual corresponding to a current manipulation and instructs the dedicated viewer software 10 corresponding to the manual type to display the portion concerned.

API-4 is an API for trace mode setting. API-4 has a program identifier as an input parameter. API-4 sets a trace mode for the online manual display mechanism 6 at a time point when the API-4 is called by a subject program 4 indicated by the program identifier. After this time point, every time the manipulation state transition notification API (API-2) is called, that is, the manipulation index is updated, API-4 instructs the dedicated viewer software 10 for the online manual concerned to display a page/line of the online manual corresponding to the updated manipulation index even if the online manual display API (API-3) is not called.

API-5 is an API for trace mode cancellation. API-5 has a program identifier as an input parameter. API-5 cancels a trace mode at a time point when API-5 is called by a subject program indicated by the program identifier. After this time point, every time the manipulation state transition notification API (API-2) is called, API-5 prevents the dedicated viewer software 10 from making an instruction to switch the display. Only at a time point when the online manual display API (API-3) is called, API-5 instructs the dedicated viewer software 10 to display a page/line of the on-line manual.

In developing a subject program 4, by setting, at an inlet (start point) of a process corresponding to each manipulation unit in the source code of the program 4, a process of calling the manipulation state transition notification API (API-2) that is included in the trace mode setting API (API-4) of the online manual display mechanism 6 by using, as a parameter, the index value of the manipulation unit corresponding to the above process, a developer can incorporate, into the program 4, a process of notifying the online manual display mechanism 6 that the procedure has moved to a new manipulation at a time point of start of execution of the manipulation unit during execution of the program 4.

Among manipulation units in the source code of a program 4 is a process that is executed in response to an input 15 that is made by an operator 16 to the program 4 or an input as a state notice 3 coming from the storage system 1.

In developing a subject program 4, by setting, at a position where to execute an interface for commanding online manual display in the source code of the program 4, a process of calling the online manual display API (API-3) that is included in the trace mode setting API (API-4) of the online manual display mechanism 6, a developer can incorporate, into the program 4, a process of instructing, during execution of the program 4, the online manual display mechanism 6 to display a description portion of the online manual corresponding to a manipulation unit at a time point of reception of an online manual display instruction.

In developing a subject program 4, by setting a process of calling the trace mode setting API (API-4) at a position where to execute an interface for setting online manual trace display in the source code of the program 4, a developer can incorporate, into the program 4, a process of instructing, during execution of the program 4, the online manual display mechanism 6 to display online manual portions again one after another following transitions to manipulations after a time point of reception of a trace display setting instruction.

In developing a subject program 4, by setting a process of calling the trace mode cancellation API (API-5) at a position where to execute an interface for canceling online manual trace display in the source code of the program 4, a developer can incorporate, into the program 4, a process of instructing, during execution of the program 4, the online manual display mechanism 6 not to display online manual portions again one after another following transitions to manipulations after a time point of reception of a trace display cancellation instruction.

Processes for realizing the respective APIs 5 will be described below.

(1) API-1 (API for Manipulation State Referencing)

The online manual display mechanism 6 has, in the inside, an execution manipulation unit (indicated by a manipulation index) management area 12. When API-1 is executed, the current value of the execution manipulation unit management area 12 is set and sent back as a return value.

(2) API-2 (API for Manipulation State Transition Notification)

When API-2 is executed, a selection is made from the manual display management table 11 based on a program identifier that is designated as an input parameter. It is checked whether the manipulation index value designated as the input parameter is one of the manipulation index values 102 that are registered in the manual display management table 11. If the check result is negative, with a judgment that the manipulation is an undefined one, an error notice is sent back to the calling source. If the check result is affirmative, the current value of the execution manipulation unit management area 12 is updated to this manipulation index value. Based on the program identifier designated as the input parameter, the trace mode of the program 4 concerned of a trace mode management area 13 that is provided inside the online manual display mechanism 6 is referred to. Where a trace mode s set, a display position of the online manual corresponding to the current execution manipulation unit is determined by referring to the manual display management table 11. The name of a manual file 17 corresponding to the corresponding manual type 103, the corresponding page number 105, and the corresponding line number 106 on the page are sent, as a display position, to the dedicated viewer software 10 corresponding to the dedicated viewer software type 104 designated in the manual display management table 11, and an instruction to display the page concerned in made.

(3) API-3 (API for Online Manual Display)

A selection is made from the manual display management table 11 based on a program identifier that is designated as an input parameter. By referring to a manipulation index value corresponding to the program identifier designated by the input parameter that is stored in the execution manipulation unit management area 12, the manual type 103, the dedicated viewer software type 104, the manual page 105, and the manual line 106 corresponding to the manipulation index value 102 are found from the manual display management table 11.

Further, a position of a manual corresponding to the version of a program currently operating is determined by referring to the manual version management table 18. Where the designated manual position is outside the computer 2, the manual position is passed to a manual downloading function 19 and an instruction to have a manual file 22 in a manual storage site 21 transferred over the Internet 20 is made.

Where the charged/free flag of the manual version management table 18 indicates that the document should be paid for, the credit data is referred to. The credit data and the manual position are passed to the manual downloading function 19 and the manual storage site 21 is requested to transfer the manual file 22 over the Internet 20. The manual storage site 21 checks the credit data. If it is legitimate, the manual storage site 21 sends back the manual file 22 to the manual downloading function 19.

By using, as parameters, a post-transfer local position of the manual file 17, the manual page 105, and the manual line 106, the dedicated viewer software 10 designated by the dedicated viewer software type 104 is instructed to display the portion of the manual corresponding to the manipulation.

(4) API-4 (API for Trace Mode Setting)

The online manual display mechanism 6 has, in the inside, the (current) trace mode management area 13. The area 13 has flag information for each subject program 4. The flag information means a trace display mode if the flag is set and means a non-trace display mode if the flag is canceled.

When API-4 is executed, a portion of the trace mode management area corresponding to a subject program 4 indicated by a program identifier that is designated as an input parameter and the execution mode is set to a trace display mode. If the execution mode has already been set to a trace display mode, this fact is communicated to the calling source as an error.

(5) API-5 (API for Trace Mode Cancellation)

Based on a program identifier that is designated as an input parameter, the trace mode of the corresponding program 4 in the trace mode management area 13 that is provided inside the online manual display mechanism 6 is canceled. If the trace mode has already been canceled, this fact is communicated to the calling side as an error.

Figure 4:
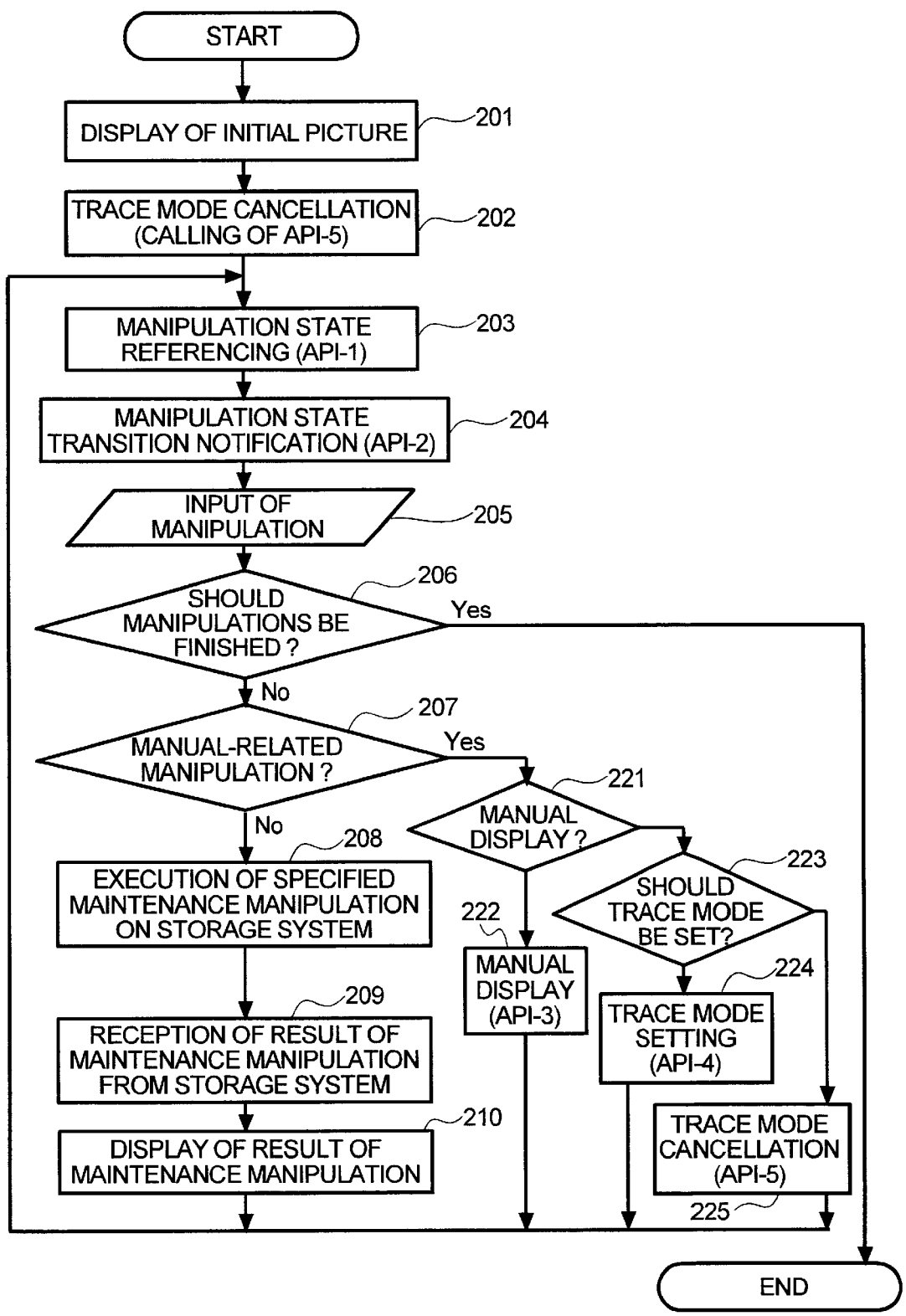
FIG. 4 is a flowchart showing a subject program.

FIG. 4 is a flowchart of a maintenance program that is one of the subject programs 4 using the above APIs 5.

At step 201, the maintenance program displays an initial picture. At step 202, API-5 for trace mode cancellation is called and the mode is canceled. As a result, as a default, no online manual is displayed during execution of the program. Conversely, it is possible to call the API-4 for trace mode setting and to make a setting that an online manual is displayed. At step 203, a current manipulation index value being held by the online manual display mechanism 6 is sent back. At step 204, API-5 is called by using, as a parameter, a manipulation index value indicating the next manipulation unit. In API-5, if a trace mode is set, the corresponding manual is displayed by the dedicated viewer software 10. No manual is displayed in the initial state because the trace mode is canceled.

At step 205, an operator inputs a manipulation. Candidates for an input item are a maintenance manipulation, online manual display request, and trace mode setting and cancellation.

At step 206, it is judged whether the input is an instruction to finish the manipulations. If the judgment result is affirmative, the execution of the subject program is finished. At step 207, it is judged whether the manipulation that was input at step 205 relates to a manual-related manipulation. At step 208, if the manipulation that was input at step 205 is a maintenance manipulation, a maintenance control is performed on the subject storage system 1. For example, the maintenance control is a control of replacing a particular hard disk drive mounted in the storage system 1. At step 209, a result of the maintenance control that was performed on the storage system 1 at step 208 is received. At step 210, the received result is displayed on the screen.

If the manipulation that was input at step 205 is a manual display, step 222 is executed; that is, API-3 is called and manual display is performed. If the input at step 205 is an instruction to set a trace mode, step 224 is executed; that is, API-4 is executed to set a trace mode. The trace mode is continued thereafter until execution of step 225. At step S225, API-5 is executed to cancel the trace mode.

In the above embodiment, it was mentioned that the online manual defining person 8 correlates programs 4 with online manuals using the online manual defining interface 7.

If the corresponding relationship between the programs and the online manuals is changed due to updating of a program or an online manual, the online manual defining person 8 needs to correlate the programs with the online manuals again. H needs to do so every time the corresponding relationship is changed. If corresponding relationships were defined for respective apparatuses, manipulations would be cumbersome.

Manipulations can be simplified by allowing a manual display management table 11 that has once been subjected to correlating to be distributed to other apparatuses.

An exemplary distribution method is to distribute files of a new manual display management table 11 together with a new program. Similarly, when a manual is updated, related files of the manual display manipulation table 11 may be distributed.

According to the invention, since the manual display is updated automatically so as to correspond to the manipulation state of an application program or the state of a storage system, optimum manual display can always be performed. As a result, in particular, it is expected that the efficiency of work of beginners who need to execute an application while referring to a manual will be increased remarkably. Further, supporting Internet downloading of a manual enables viewing of a manual that is most suitable for a program.

From the viewpoint of an application developer, the invention provides advantages that the use of APIs makes it possible to easily develop a program that implements the above functions as well as to minimize alteration of the source code of an existing program.

From the viewpoint of business, it is not necessary to incorporate manuals in a storage system in advance and latest maintenance manuals and program product manuals can always be supplied to customers and maintenance engineers irrespective of version-up of the microprogram of the storage system. Therefore, Manuals corresponding to the versions of respective subject programs can always be provided, which prevents manipulation errors and misunderstanding and saves time and labor of arranging for manuals, installing manuals in computers, and other work. This provides an advantage that the competitiveness of products can be increased. Further, the use, as a downloading condition, of credit data that is given upon payment by a customer makes it possible to profit from provision of manual information.

We claim:

1. A storage system with an online manual, comprising:
   a storage apparatus; and
   a maintenance apparatus connected to the storage apparatus, the maintenance apparatus comprising:
   a CPU for executing a maintenance program for performing a maintenance control on the storage apparatus and a manual display program for displaying a manipulation procedure of the maintenance program;
   an output device for displaying an output result of the maintenance program and the manual display program;
   a storage device for storing the maintenance program, the manual display program, manual data relating to a manipulation procedure of the maintenance program, and a manual management table showing a corresponding relationship between the manual data and pieces of identification information for identifying respective manipulation units of the maintenance program; and
   an input device for performing input processing for the maintenance program and the manual display program,
   wherein the manual display program is executable to select a first manipulation unit if a first piece of identification information is selected using the maintenance control program, the output device displaying the first information set,
   wherein the manual display program is executable to select a second manipulation unit if a second piece of identification information is selected using the maintenance control program, the output device displaying the second information set,
   wherein the first and second pieces of identification information are selected from the manual management table.

2. The storage system according to claim 1, wherein the maintenance apparatus is further connected to a manual defining apparatus, the manual defining apparatus comprising:
   output means for outputting the manual data; and
   input means for a generating a corresponding relationship between the manual data and the pieces of identification information for identifying respective manipulation units of the maintenance program,
   wherein the manual defining apparatus registers the corresponding relationship generated by the input means in the manual management table that is stored in the maintenance apparatus.

3. The storage system of claim 2, wherein a first application program interface is activated for manipulating state referencing to indicate a current execution manipulating unit.

4. The storage system of claim 3, wherein a second application program interface is activated for manipulation state transition notification to indicate a new manipulation unit.

5. The storage system of claim 4, wherein a third application program interface is activated for online manual display, the third application program interface instructing the manual display program to display the first information set of the manual data.

6. The storage system of claim 5, wherein a fourth application program interface is activated for placing the manual display program in a trace mode.

7. The storage system of claim 6 wherein a fifth application program interface is activated for canceling the trace mode.

8. The storage system of claim 1, wherein a first application program interface is activated for manipulating state referencing to indicate a current execution manipulating unit.

9. The storage system of claim 8, wherein a second application program interface is activated for manipulation state transition notification to indicate a new manipulation unit.

10. The storage system of claim 9, wherein a third application program interface is activated for online manual display, the third application program interface instructing the manual display program to display the first information set of the manual data.

11. The storage system of claim 10, wherein a fourth application program interface is activated for placing the manual display program in a trace mode.

12. The storage system of claim 11 wherein a fifth application program interface is activated for canceling the trace mode.

13. The storage system of claim 1, wherein a second application program interface is activated for manipulation state transition notification to indicate a new manipulation unit.

14. The storage system of claim 13, wherein a third application program interface is activated for online manual display, the third application program interface instructing the manual display program to display the first information set of the manual data.

15. The storage system of claim 14, wherein a fourth application program interface is activated for placing the manual display program in a trace mode.

16. The storage system of claim 15 wherein a fifth application program interface is activated for canceling the trace mode.

17. The storage system of claim 1, wherein a third application program interface is activated for online manual display, the third application program interface instructing the manual display program to display the first information set of the manual data.

18. The storage system of claim 17, wherein a fourth application program interface is activated for placing the manual display program in a trace mode.

19. The storage system of claim 18 wherein a fifth application program interface is activated for canceling the trace mode.

20. The storage system of claim 1, wherein a fourth application program interface is activated for placing the manual display program in a trace mode.

21. The storage system of claim 20 wherein a fifth application program interface is activated for canceling the trace mode.

22. The storage system of claim 1 wherein a fifth application program interface is activated for canceling the trace mode.

* * * * *